United States Patent [19]

Evans et al.

[11] Patent Number: 4,761,056

[45] Date of Patent: Aug. 2, 1988

[54] COMPACT HELMET MOUNTED DISPLAY

[75] Inventors: Charles D. Evans, Palo Alto; Andrew T. Tirums, Santa Clara; Eric W. Larkin, Union City; James E. Melzer, San Jose, all of Calif.

[73] Assignee: Kaiser Aerospace and Electronics Corporation, Oakland, Calif.

[21] Appl. No.: 30,495

[22] Filed: Mar. 27, 1987

[51] Int. Cl.⁴ ............... G02B 27/14; G02B 17/00; H04N 7/18; H04N 5/72
[52] U.S. Cl. .................. 350/174; 350/504; 350/602; 350/619; 350/622; 358/93; 358/250
[58] Field of Search ............... 350/174, 169, 538, 504, 350/602, 619, 622; 358/250, 93

[56] References Cited

U.S. PATENT DOCUMENTS

| | | | |
|---|---|---|---|
| 3,059,519 | 10/1962 | Stanton | 88/1 |
| 3,787,109 | 1/1974 | Vizenor | 350/301 |
| 3,870,405 | 6/1975 | Hedges | 350/294 |
| 3,923,370 | 12/1975 | Mostrom | 350/55 |
| 4,026,641 | 5/1977 | Bosserman et al. | 350/298 |
| 4,081,209 | 3/1978 | Heller et al. | 350/174 |
| 4,153,913 | 5/1979 | Swift | 358/93 |
| 4,361,384 | 11/1982 | Bosserman | 350/174 |
| 4,385,811 | 5/1983 | Nava | 350/638 |
| 4,465,347 | 8/1984 | Task et al. | 350/538 |
| 4,508,424 | 4/1985 | Ruder | 350/174 |

*Primary Examiner*—John K. Corbin
*Assistant Examiner*—Ronald M. Kachmarik
*Attorney, Agent, or Firm*—Marvin H. Kleinberg; Matthew F. Jodziewicz

[57] ABSTRACT

A display apparatus for use with headgear, includes in combination visor means adapted to attach to the headgear and having a visor viewing area segment positioned in the line-of-sight of a wearer of the headgear. Optical display generating means are adapted to be attached to the headgear. Parabolic mirror means are interposed in the optical path from the optical display generating means to the visor viewing area segment. Fold mirror means, including at least one fold mirror positioned to receive the image from the parabolic mirror means for directing the image to the visor viewing area segment, is provided, whereby the size and curvature of the visor can be minimized without affecting transmission of the image.

12 Claims, 2 Drawing Sheets

COMPACT HELMET MOUNTED DISPLAY

BACKGROUND OF THE INVENTION

1. Field of the Invention

This invention relates in general to head mounted displays which produce images visible to the wearer of the display, and, more particularly, to a helmet mounted display that operates in conjunction with a partially reflective visor to superimpose the display on an exterior scene that is being viewed by the wearer.

2. Description of the Related Art

Helmet mounted display apparatus finds utility in many areas, such as training, machine control or entertainment. In recent years, such devices have found particular utility in military applications where information must be supplied to vehicle operators and weapons controllers. Aircraft pilots find such devices useful to furnish information relating to aircraft operation, radar presentations, maps, weapons aiming and other things that would be useful or desirable in their mission.

The images, which are superimposed on a surface in the wearer's line of sight, can be derived from a variety of sources including cathode ray tubes (CRTs) that can be mounted in a helmet. Prior art devices have utilized fiber optics displays, flat screen liquid crystal devices with image enhancers, and even photographic projectors operating with an appropriate optical relay system, all of which might supply the wearer with an informational image.

Helmet mounted systems for displaying images are well known in the art. U.S. Pat. No. 3,059,519, to Stanton, taught a helmet mounted display in which a CRT display was directed through an optical system that included a plurality of reflecting mirrors which ultimately placed the image in the eyes of the observer, slightly above the normal line of sight. However, an alternative embodiment included a partially reflective mirror in combination with a parabolic reflector. Another alternative embodiment replaced one of the mirrors with a semi-reflective mirror so that the pilot's view would not be completely obstructed by the helmet and mirrors.

U.S. Pat. No. 3,787,109, to Vizenor, disclosed a display where the helmet was provided with a paraboloidal visor with a partially reflective coating on the inner surface as the primary optical element in transmitting the image from the generating device to the eye of the observer. Such an innovation eliminated the need for separate combiner screens or beam splitters near the eyes.

A more complex optical path that still utilized a visor was disclosed in U.S. Pat. No. 3,923,370, to Mostrom. In this patent, limited areas of the inner surface of the visor were coated to be partially or totally reflective. An image generating system mounted at the upper portion of the helmet projects an image to a first reflective area which is high on the visor. The image is relayed to a planar mirror mounted on the front of the helmet and from there to a second reflective area which is just above the normal line of sight of the observer. As a result, all of the reflective elements are deemed to be substantially out of the field of view of the helmet wearer.

A similar optical arrangement is also shown in U.S. Pat. No. 4,465,347, to Task et al. However, the image which is observed in the disclosed system is derived from a telescopic optical system which projects the image on the inner surface of the visor. The image is reflected to a planar mirror on the helmet and then to the visor again where it is directed into the eye of the viewer and appears to be a part of the exterior scene.

A substantially more complex helmet display system is disclosed in U.S. Pat. No. 4,361,384, to Bosserman. That device combines a thin film flat panel display and a wafer diode image intensifier tube. A plurality of semi-transparent optical elements direct the image from the flat panel display into the eye of the observer. The image intensifier, using some of the same optics, also directs an image into the eye where it can be superimposed over the images received from the exterior scene. The wearer thus views the exterior scene through both the visor and the flat panel display images. The visor, for reflecting purposes, can be holographic, toric, aspherical or spheric.

A toric combination was disclosed in U.S. Pat. No. 4,026,641, to Bosserman et al. The toric reflector does not appear to be a part of a visor, but rather, appears to be adapted to be mounted on the helmet.

A rather straightforward, helmet mounted system is disclosed in U.S. Pat. No. 4,153,913, to Swift, which utilizes a CRT in combination with a semi-transparent combiner screen. The patent suggests that the combiner plate be worn as goggles or spectacles.

U.S. Pat. No. 4,081,209, to Heller et al., utilizes a more complex optical system in combination with a spherical, semi-reflective combiner surface which may be part of a visor. A prism transmits the image from the source and directs it to the combiner surface which returns the image to the eye of the observer. A refractive interface at an inclined plane with respect to the image source compensates for distortion of the image due to different optical path lengths of different rays.

As will be seen, most prior art helmet visors were surfaces of revolution, usually paraboloids which resulted in a rather bulky visor. Such a design was necessitated by the requirements of tooling for the molding or forming of such visors. A modification to the design of the prior art paraboloidal visor was described in U.S. Pat. No. 3,870,405, to Hedges, which provided for a visor whose inner and outer surfaces were sections of cofocal paraboloids of revolution. Because earlier paraboloidal visors were of substantially constant thickness, images reflected off of the inner and outer surfaces did not have the same focal point and would therefore result in "ghost" images. The Hedges improvement resulted in both images being collimated with no angular difference in the pointing direction, and, as a result, the images appeared to be superimposed on the exterior scene with no loss in sharpness or clarity to the viewer.

A problem with each of the prior art references noted above and presently available helmet mounted display devices has been their size and bulk. Because the helmet member of the helmet mounted display system must be worn by an individual with many complex tasks to perform, usually under great stress and with little spare time in which to accomplish the tasks, the helmet should be as light and compact as possible while still providing superior optical performance. Specifically, bulky and large helmets cause their wearers to tire rapidly, thus shortening the effectiveness of the wearer. Similarly, poor images cause miscalculation as well as hinder the wearer's decision and reaction capabilities.

Consider, for example, the Mostrom reference system disclosed above. The Mostrom reference system includes a pair of visor mounted parabolic mirror sections working with a helmet mounted planar mirror to achieve the proper projection of the optical image into the observer's eye. However, because the parabolic mirror sections are located high on the visor for optical symmetry, the resultant helmet-visor combination tends to be rather large and bulky, requiring a substantial volume to accommodate the optical display system.

To solve the problem of bulk and weight, the present invention discloses that by replacing the single, helmet-mounted planar mirror, which is positioned on the front of the helmet above the wearer's eyes and substantially midway between the parabolic mirrors, with a pair of "fold" mirrors which rotate the images to be displayed to maintain a symmetric, although folded, arrangement of the parabolic mirror surfaces, the volume and size of the helmet and visor can be substantially reduced with improved optical performance and less physical demand on the helmet wearer.

SUMMARY OF THE INVENTION

Applicant's invention overcomes these prior art disadvantages by providing a display apparatus for use with headgear including, in combination, visor means which are adapted to attach to the headgear, and have at least one concave semi-reflecting curved surface directed inwardly of the headgear. When the headgear is being worn, the visor means is at, or is movable to, a position at which it intercepts the forward line-of-sight of an eye of the wearer.

The visor means is also further characterized in that the concave semi-reflecting surface of the visor means is part of a paraboloid having an axis of rotation. Above the level of the wearer's eyes, there is provided an optical projector by means of which luminous data is directed at the semi-reflecting surface of the visor means for reflection thereby to the wearer's eye so that the wearer is presented with a virtual image of the luminous data within a predetermined field of view centered on the wearer's forward line-of-sight. The optical projector is adapted to be attached to the headgear.

Parabolic mirror means are interposed in the optical path from the optical projector to the semi-reflecting surface of the visor means. The shape, dimensions and position of the parabolic mirror means are such that rays from the optical projector are reflected in the parabolic mirror means to a fold mirror means.

While the fold mirror means of the present invention can include any number of fold mirrors to reflect rays received from the parabolic mirror means to the semi-reflecting surface of the visor means, for simplicity of example, the fold mirror means described herein includes only a first and second fold mirrors.

The first fold mirror has a shape, dimension and position that enable it to receive the rays from the parabolic mirror means and to direct the rays to the second fold mirror. The second fold mirror, in turn, has a shape, dimension and position that enable it to direct rays received from the first fold mirror to the semi-reflecting surface of the visor means.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

In order to better understand the preferred embodiment of the invention described below, it is useful to first examine in general a typical prior art method and device.

Figure 1:
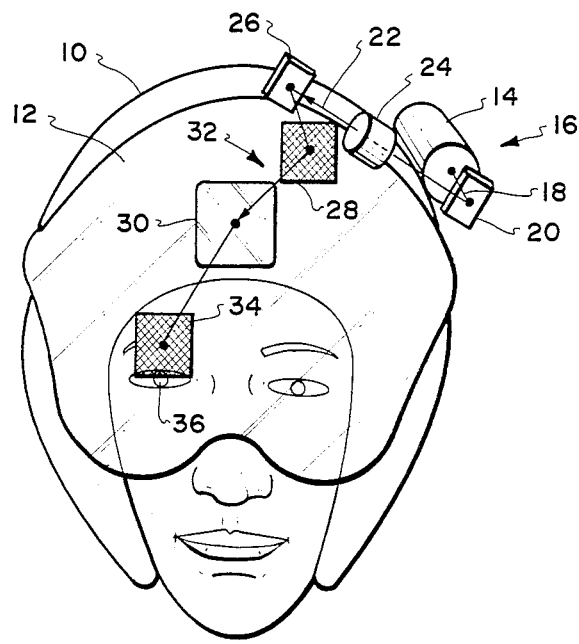
FIG. 1 is a frontal view of a typical helmet mounted display system of the prior art.
Figure 3:
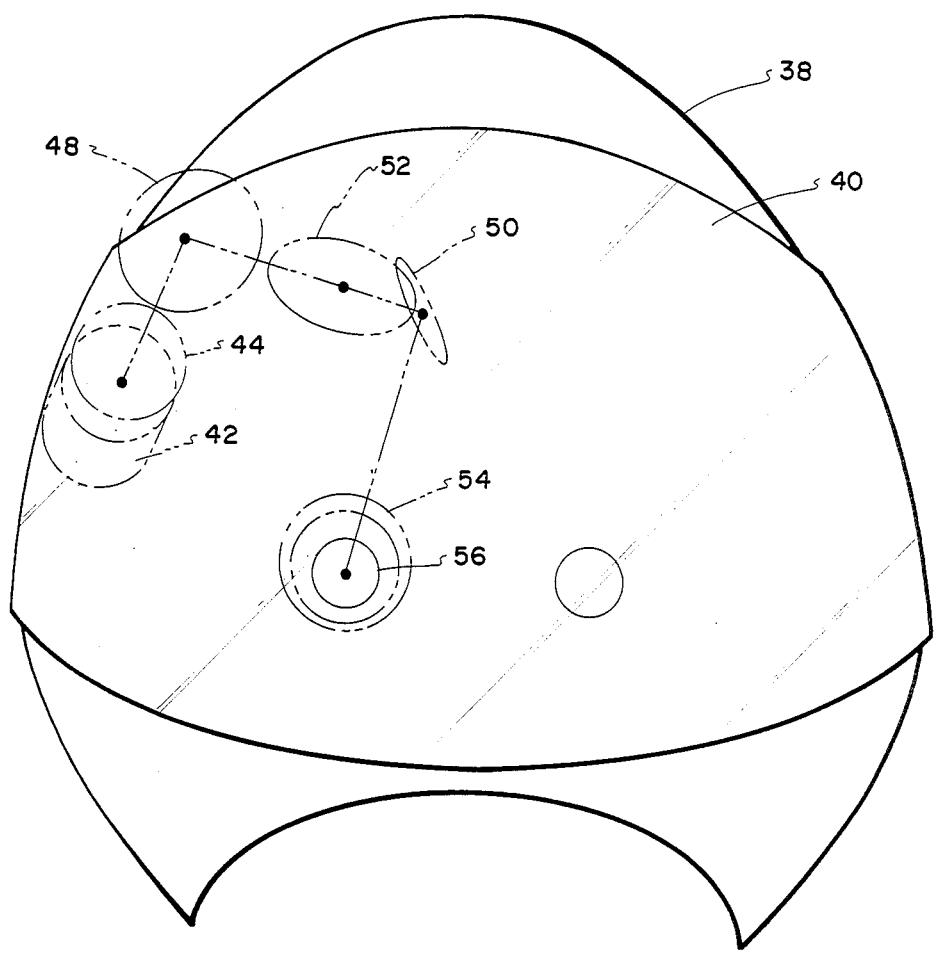
FIG. 3 is an idealized front view of the helmet mounted display system of FIG. 2.

Turning first to FIG. 1, there is shown a typical prior art helmet mounted display such as is disclosed in FIG. 3 of the above identified patent to Mostrom.

A helmet 10 has a transparent visor 12 mounted thereon. A cathode ray tube (CRT) 14 and associated projection optics 16 are mounted on the left side of helmet 10 by means which are not shown. A field lens 18 is mounted so as to transmit the images from CRT 14 to a first mirror 20. The optical path of the images transmitted by CRT 14 and associated projection optics 16 can be represented by a central ray 22 which reflects from first mirror 20 through a projection lens system 24 to a second mirror 26. The projected images are reflected by second mirror 26 to a reflective area 28 on the paraboloidal inner surface of visor 12. The projected images are then reflected back to a plane mirror 30 mounted on the front of helmet 10.

Reflective area 28 is part of a paraboloidal surface with an axis 32 that is just below mirror 30 and is perpendicular to its plane. The aperture of mirror 30 is centered significantly above the focal point of the paraboloid forming the paraboloidal surface of visor 12. Light striking mirror 30 is reflected to a second area 34 on the surface of visor 12. Second area 34 is treated to be partially reflective. While reflective mirror areas 28, 34 are shown as squares, their shapes are not critical and in some embodiments are generally somewhat rectangular.

This prior art arrangement has been designed to keep mirror 30 and reflective area 28 well above the observer's line of sight and preferably outside of his range of vision. Further, this apparatus is intentionally arranged to be non symmetrical with respect to axis 32 of the paraboloid. Further, the reflective area 34 is positioned to be slightly above the eye 36 of the observer.

Recent experiments, however, have determined that in some applications, it is desirable to have a reflective area positioned directly in the line-of-sight of the observer. Further, considering the space limitations frequently found in the cockpits of military vehicles, including aircraft, where such helmet mounted displays are most useful, test have shown that helmets and visors such as those of the prior art described above require headgear and visors that were higher and bulkier, that is, require greater volume and weight, than was comfortable or convenient for the average wearer.

Figure 2:
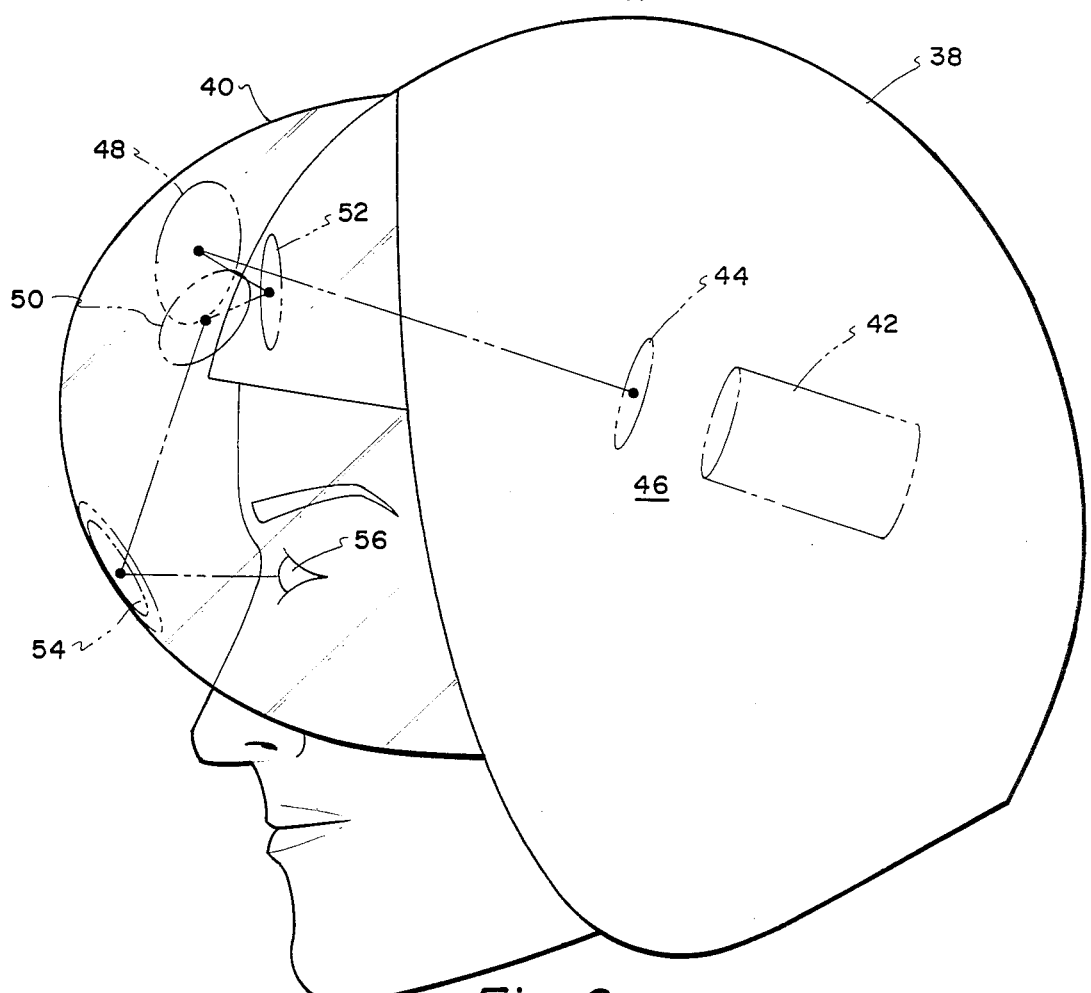
FIG. 2 is a side section view of a helmet mounted display system according to the present invention.

FIGS. 2 and 3, show in side and frontal view, an improved helmet mounted display and helmet visor combination embodying the present invention. A helmet 38 has a visor 40 with a generally curved shape. A cathode ray tube (CRT) 42 with associated optics 44 is mounted on the upper side 46 of helmet 38. A first parabolic mirror 48 may be integral with visor 40 or may be attached thereto. In the preferred embodiment, first parabolic mirror 48 can be a local parabolic section of visor 40 that has been treated with a coating to be either fully or partially reflective to the images projected from CRT 42 and associated projection optics 44, since it is substantially out of the field of view and line-of-sight of the wearer of helmet 38.

A pair of "fold" mirrors 50, 52 are positioned adjacent first parabolic mirror 48 and act to redirect the image transmitted by CRT 42 and associated projection optics 44 to a parabolic segment 54 of visor 40 which is treated with a coating to be reflective. Parabolic visor segment 54 is of an appropriate shape, curvature, dimension and position to direct images transmitted by CRT 42 and associated projection optics 44 to the eye 56 of the wearer of helmet 38.

The spatial locations of the parabolic mirror 48 and the fold mirrors 50, 52, are optimized to accomplish a number of goals. First, the locations are chosen to minimize the volume of the helmet 10 by following the contour of the head with the optical path from the CRT 42 to the parabolic segment 54 of the visor 40.

Second, the locations are chosen to reduce the overall height of the center of gravity of the associated projection optics 44. The optical path from the CRT 42 to the parabolic visor segment 54 is routed to the side of the head of the helmet wearer and downward to the rear of the helmet wearer. For high-gravity maneuverability on tactical aircraft, it is preferred to have an aft center of gravity for the associated projection optics 44.

Third, the locations are chosen to collimate properly the light rays carrying the images generated by the CRT. Parallel light rays entering into the parabolic mirror 48 then can exit as parallel light rays from the fold mirrors 50,52.

Conventional technology may be employed to produce a generally paraboloidal visor 40 which may be treated to be partially reflective in selected, desired areas, in accordance with the teachings of the co-pending application Ser. No. 06/923,285 filed Oct. 27, 1986, and assigned to the assignee of the present invention. The visor may also be specially configured so that the correct paraboloidal shape for reflective purposes can be located in only those areas in which reflection is necessary, and that any other desired shape or curvature can be employed for the remainder of the visor.

In general, the visor viewing area should be parabolic in shape and located in the line of sight of the helmet wearer, either centered or displaced. Nevertheless, the invention could also include embodiments that have other aspheric shapes than parabolic for optical correction purposes. For example, one possibility is a spherical visor with a buried hologram that contributes power such that the over-all effect is that of a parabolic surface at a sharply defined wavelength of interest.

Another possibility would be a visor surface that is a higher order asphere, for example, for large fields of view, the symmetric parabolas of the preferred embodiment described herein are inadequate from a performance standpoint, and a more compelex surface would be required at large angular distances from the line of sight.

While the preferred embodiment described herein includes a CRT as its image generating means, other optical image generating means such as fiber image generators, liquid crystal displays, electroluminescence, laser diodes with scanners, etc., may also be used in this invention as optical image generating means.

Further, through the use of additional mirrors and/or CRT displays similar to that described above, images can be brought to both eyes of the helmet wearer.

The invention described above is, of course, susceptible to many variations, modifications and changes, all of which are within the skill of the art. It should be understood that all such variations, modifications and changes are within the spirit and scope of the invention and of the appended claims. Similarly, it will be understood that they are intended to cover all changes, modifications and variations of the example of the invention which is herein disclosed for the purpose of illustration and which do not constitute departures from the spirit and scope of the invention.

We claim:

1. A display apparatus for use with headgear comprising, in combination:

visor means adapted to attach to said headgear and having at least one concave semi-reflecting curved surface directed inwardly of the headgear and which, when the headgear is being worn, is at or is movable to a position at which it intercepts the forward line-of-sight of an eye of the wearer and is characterized in that the concave semi-reflecting surface is part of a paraboloid having an axis of rotation;

an optical projector above the level of the wearer's eyes, by means of which luminous data is directed at said semi-reflecting surface for reflection thereby to the wearer's eye so that the wearer is presented with a virtual image of the luminous data within a predetermined field of view centered on the wearer's forward line-of-sight, said optical projector adapted to be attached to said headgear;

parabolic mirror means interposed in the optical path from said optical projector to said semi-reflecting surface of said visor, whose shape, dimensions and position are such that rays from said optical projector are reflected in said parabolic mirror means; and fold mirror means, including first and second fold mirrors, said first fold mirror whose shape, dimension and position enable it to receive the rays from said parabolic mirror means and to direct the rays to said second fold mirror, said second fold mirror whose shape, dimension and position enable it to direct rays received from said first fold mirror to said semi-reflecting surface of said visor.

2. A display apparatus as defined in claim 1 wherein said parabolic mirror means is attached to said visor means.

3. A display apparatus as defined in claim 1 wherein said parabolic mirror means is integrally formed with said visor means.

4. A display apparatus as defined in claim 1 wherein said parabolic mirror means is a local parabolic surface section of said visor means having enhanced reflectivity.

5. A display apparatus as defined in claim 1 wherein said first and second fold mirrors are attached to said headgear.

6. A display appparatus as defined in claim 1 wherein said semi-reflecting curved surface of said visor means permits both the reflected virtual image of the luminous data and direct images in the wearer's line-of-sight to reach the eyes of the headgear wearer.

7. A display apparatus for use with headgear, comprising in combination:

visor means adapted to attach to the headgear and having a parabolic visor segment positioned to be in the normal line-of-sight of the headgear wearer;

optical display generating means adapted to be attached to the headgear;

parabolic mirror means interposed in the optical path from said optical display generating means to said parabolic visor segment; and fold mirror means including first and second fold mirrors, said first fold mirror being positioned to receive the image from said parabolic mirror means and to direct the image to said second fold mirror, said second fold mirror being positioned to direct images received from said first fold mirror to said parabolic visor segment, whereby the size and curvature of the visor can be minimized without affecting transmission of the image.

8. A display apparatus as defined in claim 7 wherein said parabolic mirror means is attached to said visor means.

9. A display apparatus as defined in claim 7 wherein said parabolic mirror means is integrally formed with said visor means.

10. A display apparatus as defined in claim 7 wherein said parabolic mirror means is a local parabolic surface section of said visor means having enhanced reflectivity.

11. A display apparatus as defined in claim 7 wherein said first and second fold mirrors are attached to said headgear.

12. A display apparatus as defined in claim 7 wherein said parabolic visor segment permits both the reflected virtual image of the images from said optical display generating means and direct images in the headgear wearer's line-of-sight to reach the eyes of the headgear wearer.

* * * * *